US009575366B2

(12) United States Patent
Srivastava et al.

(10) Patent No.: US 9,575,366 B2
(45) Date of Patent: Feb. 21, 2017

(54) FAST SWITCHABLE AND HIGH DIFFRACTION EFFICIENCY GRATING FERROELECTRIC LIQUID CRYSTAL CELL

(71) Applicant: THE HONG KONG UNIVERSITY OF SCIENCE AND TECHNOLOGY, Clear Water Bay, Kowloon (HK)

(72) Inventors: Abhishek Kumar Srivastava, Aishbagh Lucknow (IN); Wei Hu, Nanjing (CN); Yanqing Lu, Nanjing (CN); Fei Xu, Nanjing (CN); Vladimir Grigorievich Chigrinov, Sai Kung (HK); Hoi Sing Kwok, Tiu Keng Leng (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 345 days.

(21) Appl. No.: 13/723,744

(22) Filed: Dec. 21, 2012

(65) Prior Publication Data
US 2013/0169909 A1    Jul. 4, 2013

Related U.S. Application Data

(60) Provisional application No. 61/631,193, filed on Dec. 29, 2011.

(51) Int. Cl.
*G02F 1/1337* (2006.01)
*G02F 1/1335* (2006.01)
*G02F 1/141* (2006.01)

(52) U.S. Cl.
CPC .. *G02F 1/133788* (2013.01); *G02F 1/133528* (2013.01); *G02F 1/133753* (2013.01); *G02F 1/141* (2013.01); *G02F 2001/133757* (2013.01)

(58) Field of Classification Search
CPC ........................... G02F 1/141; G02F 1/133753
(Continued)

(56) References Cited

U.S. PATENT DOCUMENTS 5,299,289 A    3/1994  Omae et al.
5,539,555 A *  7/1996  Wand et al. ................. 349/171
(Continued)

OTHER PUBLICATIONS

Bunning, T.J. et al., "Electrically Switchable Gratings Formed Using Ultrafast Holographic Two-Photon-Induced Photopolmerization," *Chem. Mater.*, 12, 2842 (2000).
(Continued)

*Primary Examiner* — Kendrick Hsu
(74) *Attorney, Agent, or Firm* — Leydig, Voit & Mayer, Ltd.

(57) ABSTRACT

A liquid crystal cell structure is provided. The liquid crystal cell structure includes: two polarizers; and a liquid crystal diffractive light modulating cell placed between the two polarizers. The cell includes: two transparent substrates treated by photoalignment; and a ferroelectric liquid crystal layer disposed between the two transparent substrates with current conducting layers, the ferroelectric liquid crystal layer comprising ferroelectric liquid crystals. The two transparent substrates treated by photoalignment are configured to provide multiple alignment domains in the ferroelectric liquid crystals with a planar surface orientation. Adjacent domains of the multiple alignment domains are oriented at an angle with respect to each other.

9 Claims, 9 Drawing Sheets

(58) Field of Classification Search
USPC .......................................... 349/129, 130, 132
See application file for complete search history.

(56) References Cited

U.S. PATENT DOCUMENTS

| | | | |
|---|---|---|---|
| 5,576,870 | A | 11/1996 | Ohmae |
| 5,638,201 | A | 6/1997 | Bos et al. |
| 5,754,264 | A | 5/1998 | Bryan-Brown et al. |
| 5,883,687 | A | 3/1999 | Lu et al. |
| 6,188,462 | B1 | 2/2001 | Lavrentovich et al. |
| 6,258,296 | B1* | 7/2001 | Johno et al. ............. 252/299.64 |
| 6,344,890 | B1* | 2/2002 | Ishii .............................. 349/174 |
| 6,821,457 | B1 | 11/2004 | Natarajan et al. |
| 7,184,615 | B2 | 2/2007 | Levola |
| 7,692,759 | B2 | 4/2010 | Escuti et al. |
| 7,880,847 | B2* | 2/2011 | Yoneya et al. ................ 349/132 |
| 2006/0262245 | A1* | 11/2006 | Burberry et al. ............... 349/86 |
| 2010/0231847 | A1 | 9/2010 | Escuti |
| 2011/0043717 | A1* | 2/2011 | Valyukh et al. ................ 349/33 |

OTHER PUBLICATIONS

Zhou, Jian et al., "Switchable Gratings by Spatially Periodic Alignment of Liquid Crystals Via Patterned Photopolymerization," *Opt. Letter*, 31, 652 (2006).

Liu, Y.J. et al., "A Polarization Insensitive 2×2 Optical Switch Fabricated by Liquid Crystal-polymer composite," *Appl. Phys. Lett.*, 86, 041115 (2005).

Zhu, Minhua et al., "Electrically Switchable, Polarization-Independent Diffraction Grating Based on Negative Dielectric Anisotropy Liquid Crystal", *Appl. Phys. Lett.*, 88, 253502 (2006).

Oh, Chulwoo et al., "Achromatic Diffraction from Polarization Gratings with High Efficiency", *Opt. Lett.*, vol. 33, 2287 (2008).

Komanduri, R.K. et al., "High Efficiency Reflective Liquid Crystal Polarizatin Gratings," *Appl. Phys. Lett.*, 95, 091106 (2009).

Gu, Lanlan et al., "Fringing-field Minimization in Liquid-Crystal-Based High-Resolution Switchable Gratings," *Appl. Phys. Lett.*, 87, 201106 (2005).

* cited by examiner

FAST SWITCHABLE AND HIGH DIFFRACTION EFFICIENCY GRATING FERROELECTRIC LIQUID CRYSTAL CELL

CROSS-REFERENCE TO RELATED APPLICATIONS

This patent application claims the benefit of U.S. Provisional Patent Application No. 61/631,193, filed Dec. 29, 2011, which is incorporated by reference.

FIELD

The present invention relates to a liquid crystal (LC) photonic device, and particularly to liquid crystal cells having fast response and high diffraction efficiency for fast response photonics devices such as modulators, filters, attenuators, gratings, etc.

BACKGROUND

LC photonic devices have found widespread commercial applications in a variety of fields ranging from spatial light modulators to photonic LC fibers because of their excellent tunability of refractive index with electric and magnetic fields. Switchable gratings are a type of LC photonic device that is useful for applications such as displays, beam steering, tunable filters, and telecommunication components.

A number of LC-based architectures have been proposed for switchable optical gratings. One class of liquid crystal gratings involves phase separation of a mixture of a liquid crystal and another material, typically a polymer, and exploits the refractive index difference between the background matrix and liquid crystal dopant. A second class of such gratings involves conventional patterned electrodes. Another approach to make switchable gratings is to use different alignment in adjacent grating portions. This approach includes two different alignment domains constructing the grating structure. These two different alignment domains could be the combination of a planar alignment domain and a homeotropic alignment domain, the combination of a planar alignment domain and a twist alignment domain, the combination of two planar alignment domains, etc.

Manufacturing cost and diffraction efficiency are critical issues with respect to switchable gratings. The existing LC-based architectures discussed above, particularly in the case of holographic polymer dispersed LCs gratings, have serious drawbacks, including expensive fabrication process, slow response time (about 2~100 ms), scattering losses, and high driving voltages (>100 V).

SUMMARY

In an embodiment, the present invention provides a liquid crystal cell structure, including: two polarizers; and a liquid crystal diffractive light modulating cell placed between the two polarizers. The cell includes: two transparent substrates treated by photoalignment; and a ferroelectric liquid crystal layer disposed between the two transparent substrates with current conducting layers, the ferroelectric liquid crystal layer comprising ferroelectric liquid crystals. The two transparent substrates treated by photoalignment are configured to provide multiple alignment domains in the ferroelectric liquid crystals with a planar surface orientation. Adjacent domains of the multiple alignment domains are oriented at an angle with respect to each other.

BRIEF DESCRIPTION OF THE SEVERAL VIEWS OF THE DRAWINGS

FIG. 6A illustrates the electro-optical response of the first order beam. FIG. 6B illustrates the electro-optical response of the zero order beam. FIG. 6C illustrates the corresponding applied voltage.

DETAILED DESCRIPTION

Figure 1:
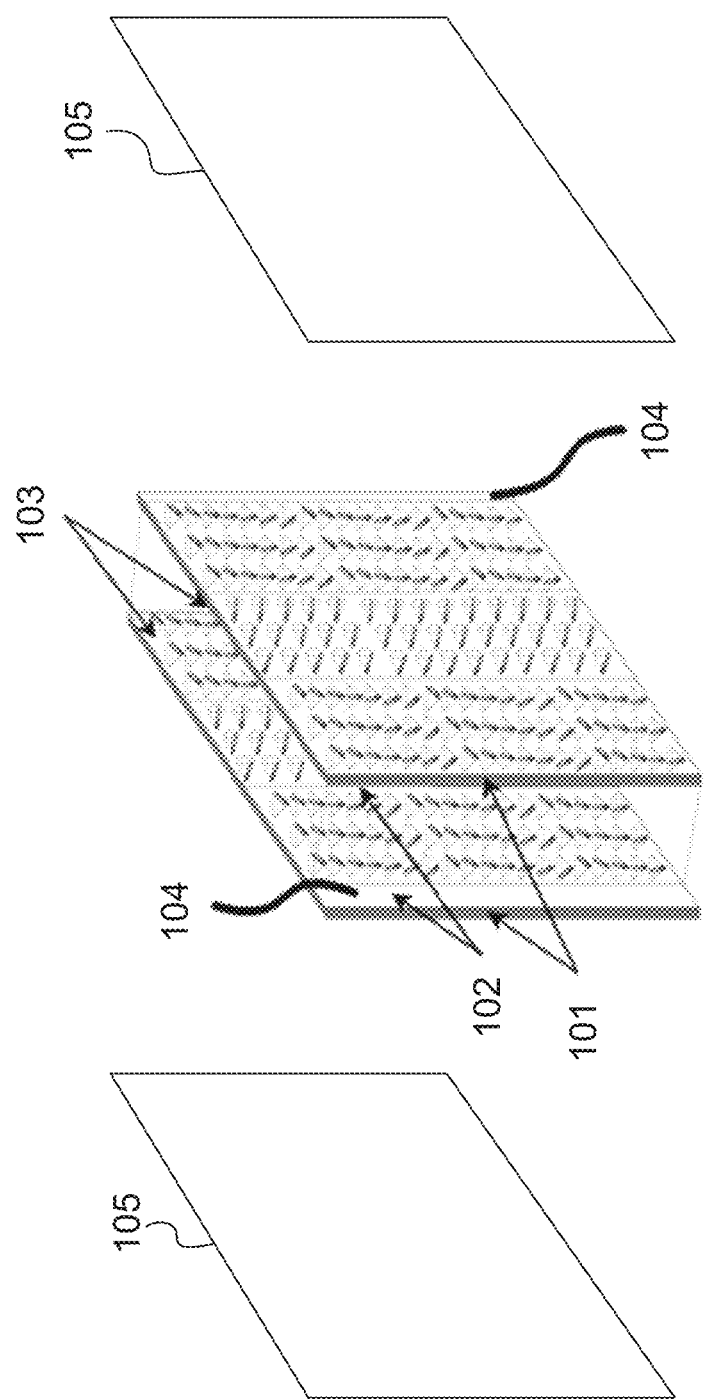
FIG. 1 is an exemplary diagram of a ferroelectric liquid crystal grating cell having two alignment domains with mutually perpendicular alignment directions and smectic layers that are perpendicular to the substrate.

Embodiments of the present invention use ferroelectric liquid crystals (FLCs) in LC-based architectures. FLCs offer very high switching speed at very low driving voltage, but using FLCs is conventionally known to be challenging due to fundamental geometrical defects of FLCs, which hinder contrast and make alignment difficult. The FLC-based architecture provided by embodiments of the present invention overcomes these challenges and achieves an FLC-based architecture suitable for fast response photonic devices without the drawbacks of conventional LC-based architectures (e.g., high manufacturing cost, slow response time, scattering losses, and high driving voltage requirement).

In an embodiment, an FLC grating cell is provided with electrically suppressed helix (ESH) electro-optical mode, where the FLC helix pitch is less than the liquid crystal layer thickness. The liquid crystal layer includes chiral smectic liquid crystals and is placed between two polarizers. AC rectangular voltage is applied to the electrodes of the cell, with amplitude higher than the critical voltage amplitude of the helix unwinding. The cell has two alignment domains forming a grating structure, wherein the helical axes in the adjacent alignment domains are deployed (by photoalignment) at an angle of 90° with respect to each other and parallel to the surface of the cell.

The FLC grating cell is switchable and provides a diffraction efficiency of more than 99%, response time less than 10 μs, and contrast of more than 7000:1 for frequencies less than 1 kHz (the contrast ratio is around 6000:1 for a frequency of 2 kHz and around 4200:1 for a frequency of 5 kHz). These gratings show perfect electro-optical modulation (i.e., saturation of bright and dark states for maximum and minimum transmittance (respectively) in a given time frame derived from applied frequency) up to very high frequencies (e.g., up to 5 kHz) at low magnitude of driving voltage (e.g., less than 6.5 V/μm).

The different alignment in the adjacent alignment domains is achieved by two-step photo exposure of an optically active sulfonic Azo dye SD1 layer, coated on a transparent conducting glass plate. Such gratings, used with the electrically suppressed helix electro-optical mode, provide very high optical contrast (e.g., 7000:1), small electro-optical response (less than 10 μs), and perfect electro-optical modulation (i.e., saturated optical states) up to a frequency of 5 kHz at the electric field of 6.5 V/μm.

In a first exemplary embodiment, an FLC grating cell is provided with a chiral liquid crystal layer that corresponds to a ferroelectric liquid crystal of chiral smectic C* phase whose helical structure has a pitch $P_0$ smaller than a gap d between the first and the second substrates of the cell. The cell has two alignment domains, which forms the grating structure. By using two-step photo exposure of an optical active sulfonic azo dye SD1 layer coated on an inner surface of the cell, the principal optical axes of the FLC in the adjacent alignment domains are deployed at an angle of 90° with respect to each other.

In a first step of the alignment process, alignment is made in one direction. Then, after the cell is assembled, the cell is exposed again through a mask with UV light having an orthogonal polarization azimuth relative to the polarization azimuth of the exposing light in the first step. Through this two-step process, two alignment domains are generated simultaneously on the two aligning surfaces of the cell (on the top and bottom glass plates) without any mutual shifting. Thus, a simple and precise fabrication process is provided where fine-grained adjustment is not required for the alignment domains of the cell.

It will be appreciated that the angle between two alignment domains could be changed to any value higher than the tilt angle of the ferroelectric liquid crystal. Moreover, ferroelectric liquid crystal could have a pre-tilt angle on the surface to avoid the chevron defects.

An exemplary FLC grating cell is shown in FIG. 1, which includes substrates 101, conductive layers 102, smectic layers 103, wires 104 for electrical connection to the conducting layer and polarizers 105. The substrates 101 are transparent so as to allow visible light to pass through. The conductive layers 102, which for example could be ITO, are also transparent and are covered with alignment layers. The smectic layers 103 are perpendicular to the plane of the substrates such that the helix axis of the ferroelectric liquid crystals is parallel to the plane of substrates.

Figure 2:
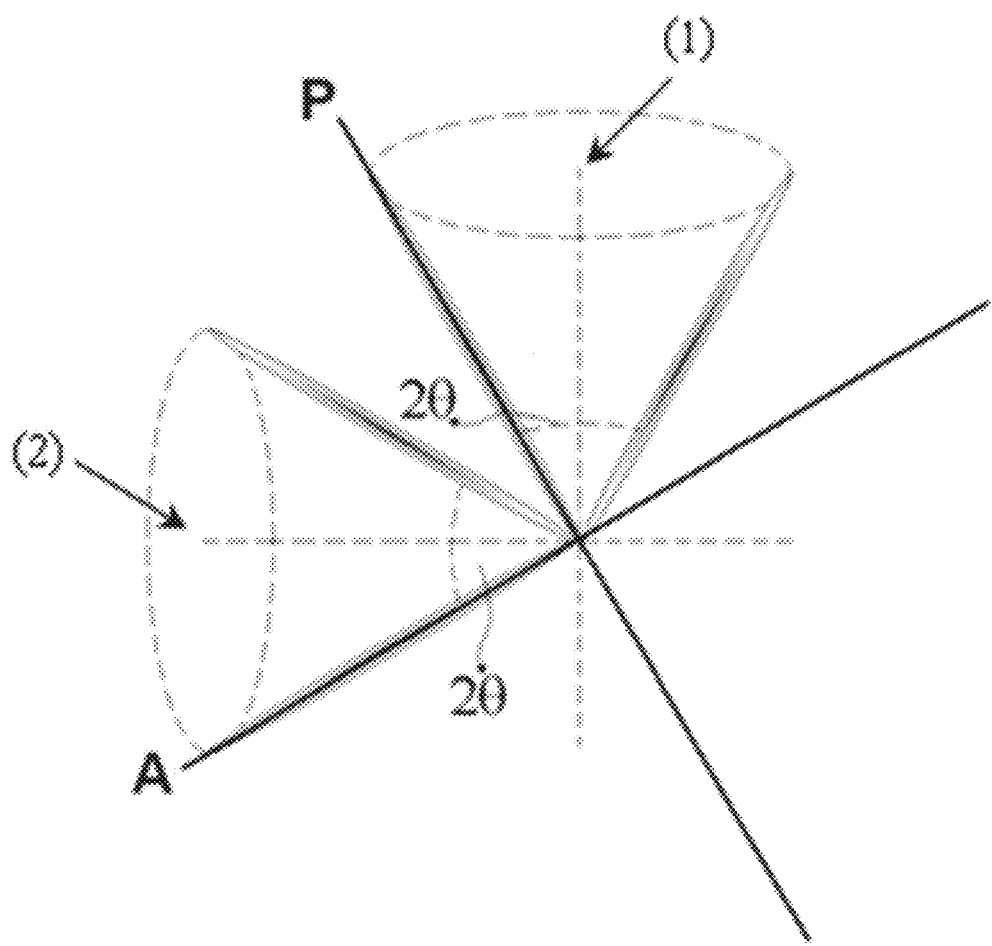
FIG. 2 is an exemplary diagram illustrating the electro-optics for ferroelectric liquid crystals in two different alignment domains between crossed polarizers, where (1) and (2) represent two FLC alignment domains and P and A represent a polarizer and an analyzer, respectively.

The FLC grating cell is placed between two crossed polarizers such that the polarizer plane is parallel to a switching angle of any one of the alignment domains, as illustrated in FIG. 2. It will be appreciated that for FLC material, θ is approximately equal to 22.05 degrees. Further, AC rectangular voltage pulses are applied to the liquid crystal cell to switch the ferroelectric liquid crystal molecules from one position to other and visa versa.

Figure 3A:
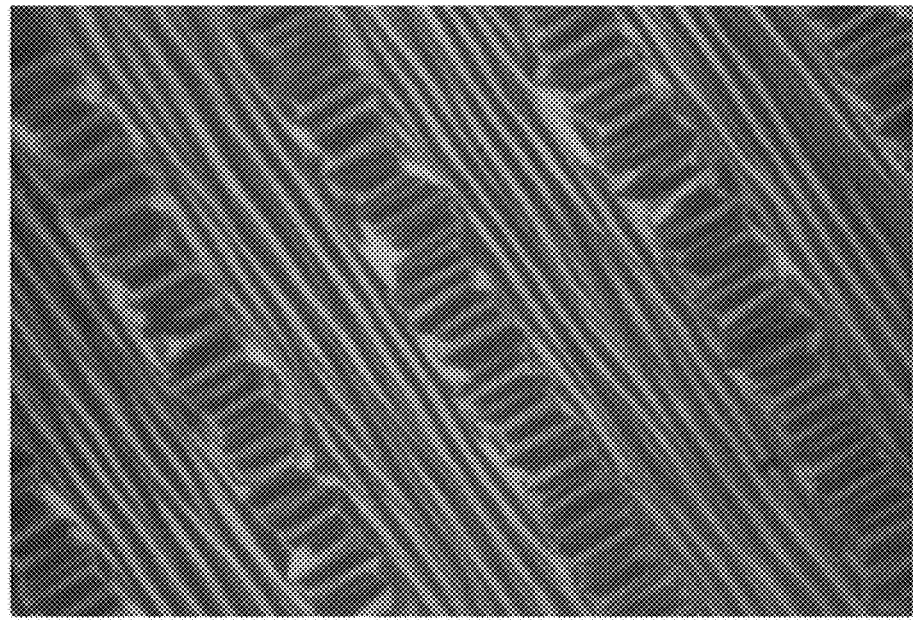
FIGS. 3A and 3B are optical micrographs of the 1D and 2D ferroelectric liquid crystals grating under cross polarizer respectively. Both of the domains have been aligned mutually orthogonal to each other.
Figure 3B:
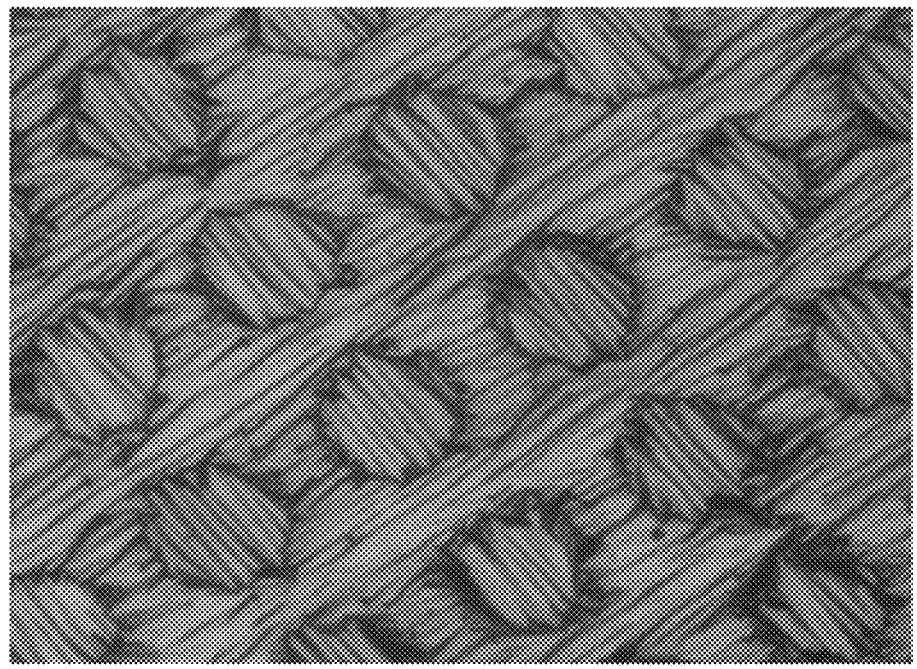

FIGS. 3A and 3B are optical micrographs of the 1D and 2D ferroelectric liquid crystals grating under cross polarizer respectively. Both of the domains have been aligned mutually orthogonal to each other. However, it will be appreciated that for different performance, the angle between them could be changed to any value greater than the tilt angle of ferroelectric liquid crystal.

Figure 4A:
FIG. 4A depicts the diffraction pattern for the diffractive states for a 1D ferroelectric liquid crystal grating.
Figure 4B:
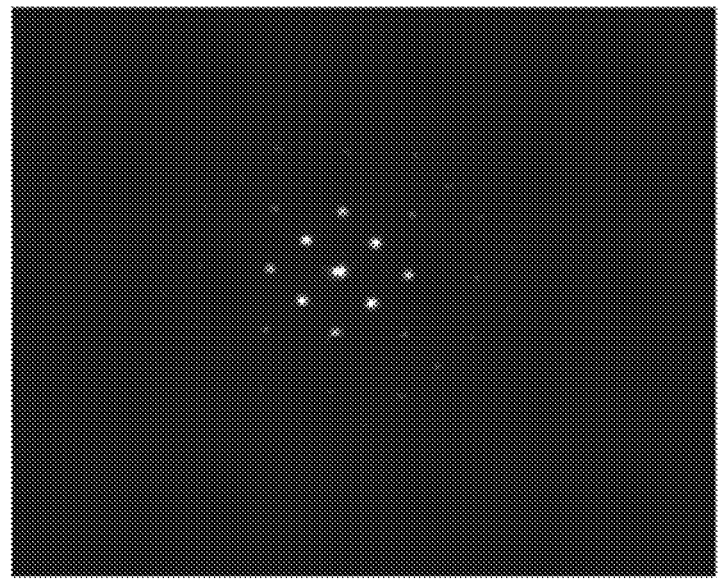
FIG. 4B depicts the diffraction pattern for the diffractive states for a 2D ferroelectric liquid crystal grating
Figure 4C:
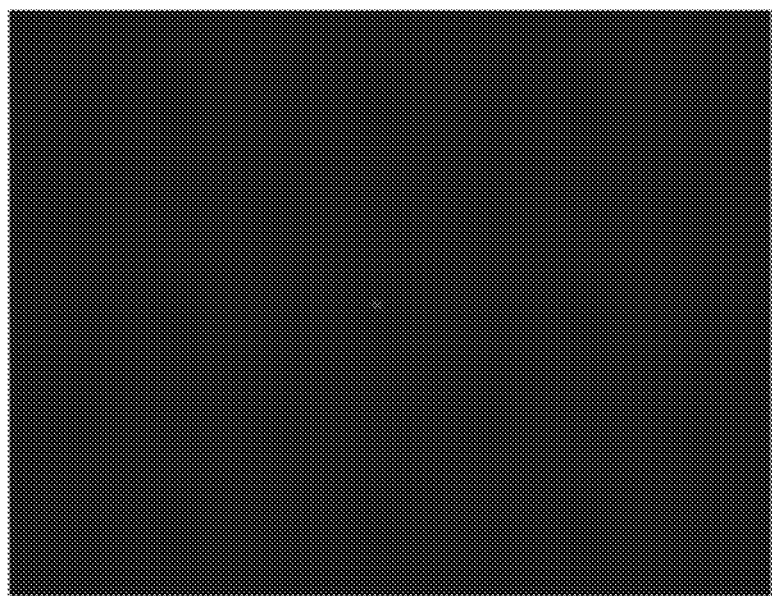
FIG. 4C depicts the non diffractive state for the 1D grating, which is the same as for the 2D grating.

As a result of the polarizers and the applied voltage pulses, diffraction patterns appear in the bright state while no diffraction exists in the dark state. FIG. 4A depicts the diffraction pattern for the diffractive states for a 1D ferroelectric liquid crystal grating. FIG. 4B depicts the diffraction pattern for the diffractive states for a 2D ferroelectric liquid crystal grating. FIG. 4C depicts the non diffractive state for the 1D grating, which is the same as for the 2D grating as well. Further, by choosing an optimum angle between the two alignments domains, the diffraction can be tuned either in bright or in dark state. For instance, in one example, diffraction could be shifted in the dark state by choosing an appropriate angle between the two domains.

Figure 5:
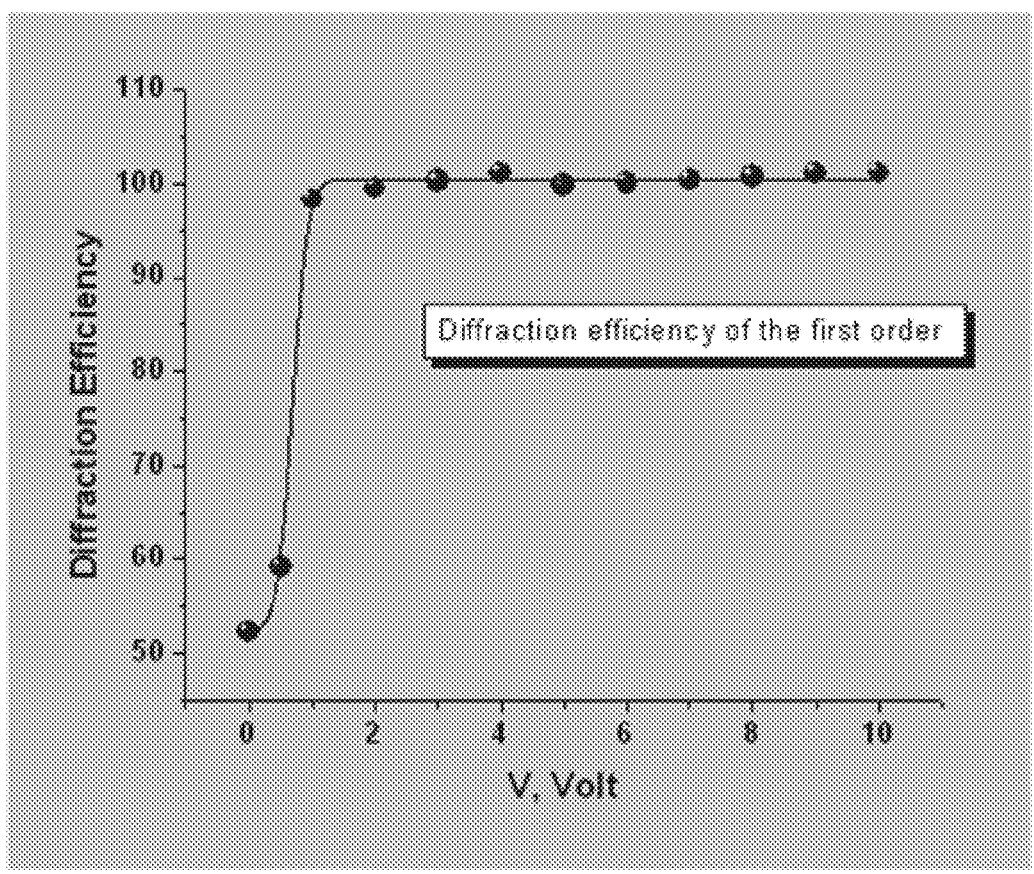
FIG. 5 is a graph illustrating the voltage dependence of the diffraction efficiency of the first order, which increases with increasing voltage and saturates at 2V. The diffraction efficiency is more than 99% for the first order.

FIG. 5 is a graph illustrating the voltage dependence of the diffraction efficiency of the first order, which increases with increasing voltage and saturates at 2V. The diffraction efficiency is more than 99% for the first order. FIG. 5 further shows that the characteristics of the diffraction profile are dependent on the electric field applied.

In a second exemplary embodiment, an FLC grating cell is provided with FLC layer thickness d greater than helical pitch $P_0$. A voltage V that is greater than the critical voltage for the helix unwinding (hereinafter abbreviated $V_c$) is applied to the FLC grating cell (i.e. $V>V_c$) such that the FLC grating cell is in Electrically Suppressed Helix (ESH) electro-optical mode. While first order diffraction efficiency strongly depends on the amplitude of the driving voltage for $V<V_c$, for $V>V_c$ where V is sufficiently higher than $V_c$ the first order diffraction efficiency is more than 99% and is not sensitive to the amplitude of the driving voltage.

The response time of FLC grating cell for zero order and first order diffraction pattern, at any applied driving voltage $V>V_c$, shows electric field dependence similar to the ESH mode (i.e., the dynamics of ESH mode and a grating based on ESH mode are similar). The electric field dependence of the response time at frequency of 500 Hz has been presented in FIG. 7. The peak in the dependencies of response time on driving voltage represents the critical voltage ($V_c$) of helix unwinding.

Figures 6A, 6B, 6C:
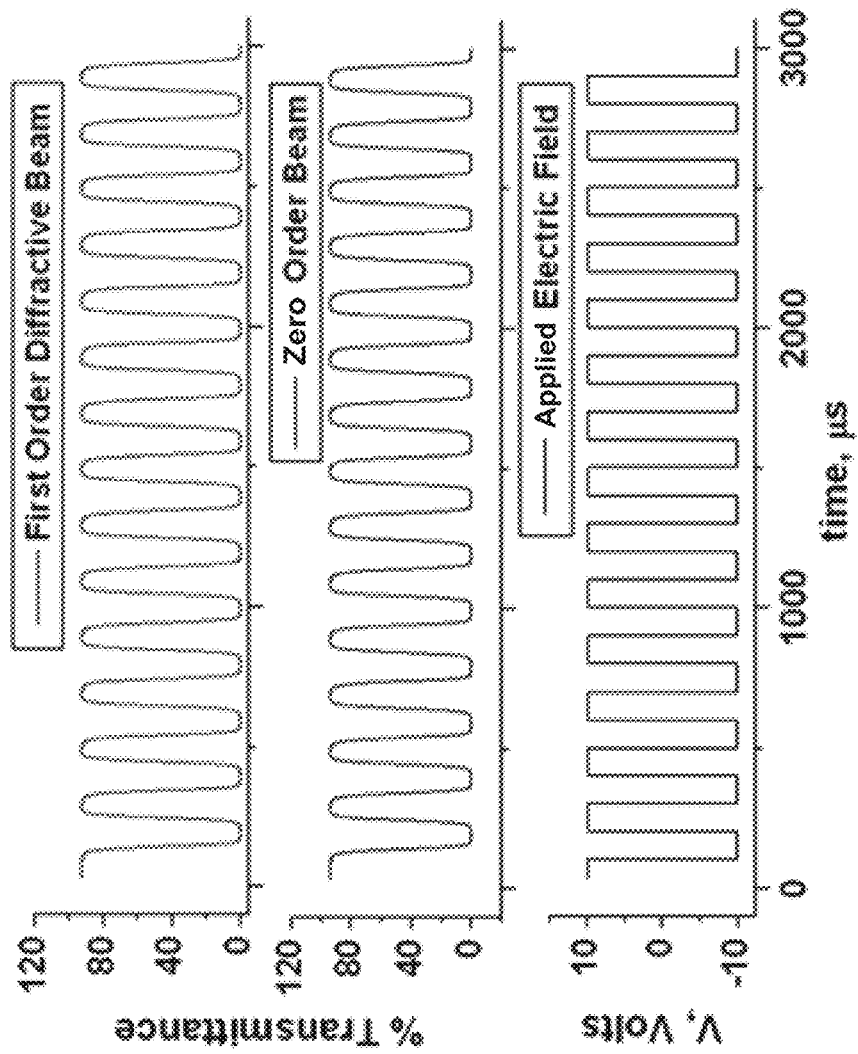
FIGS. 6A-6C are graphs illustrating the electro-optical response of an exemplary FLC grating cell to an applied voltage at temperature (T)=22° C., wavelength (λ)=0.63 μm and operational frequency (f) of 5 kHz.
Figure 7:
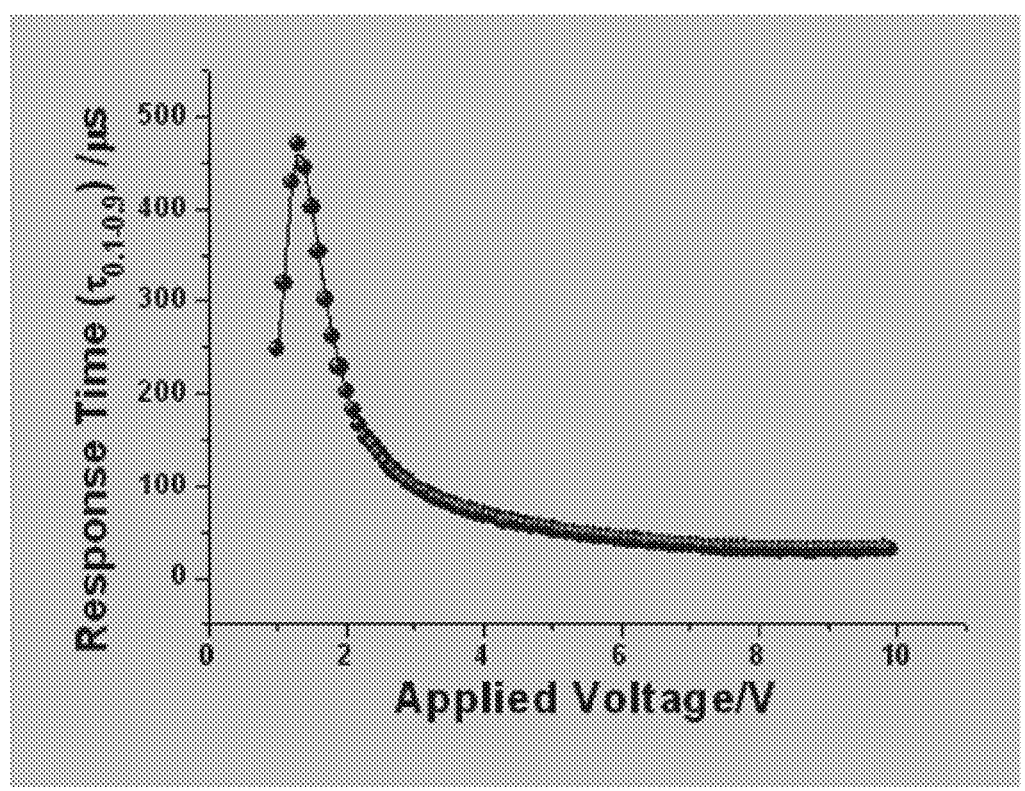
FIG. 7 is a graph illustrating the relationship between response time and driving voltage for an exemplary FLC grating cell at a driving frequency of 500 Hz.

For $V>V_c$ the first order response time is strongly sensitive to the electric field similar to the ESH mode (FIG. 7). The characteristic response time for the first order diffraction pattern is less than 10 μs for driving voltage of magnitude 10 V. The FLC grating shows perfect electro-optical modulation for diffraction pattern up to very high frequency of operating voltage, which could be 5 kHz (see FIG. 6).

Figure 8:
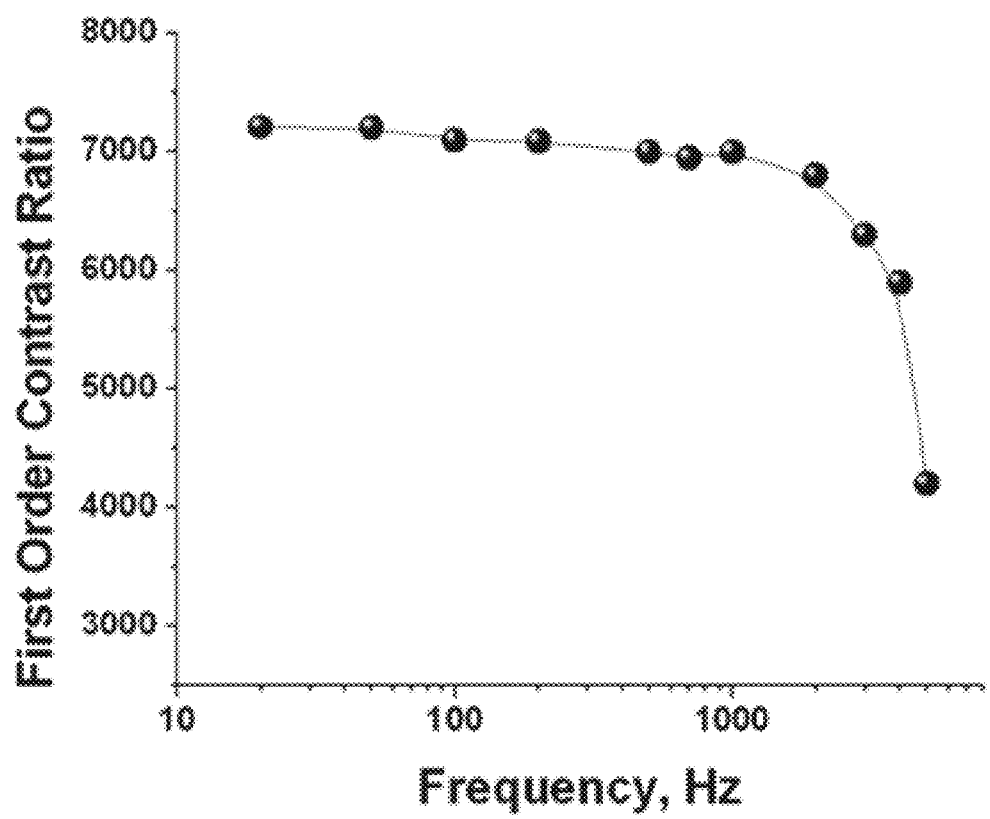
FIG. 8 is a graph illustrating the relationship between first order contrast ratio and frequency for an exemplary FLC grating cell at 10 V.

The dependency of contrast for the first order diffraction on the driving voltage frequency is presented in FIG. 8. The FLC grating cell with $d>P_0$ and electrically suppressed helix (ESH) mode provides very high contrast ratio up to very high operating voltage frequency. The contrast of first order diffraction order is more than 6000:1 up to the frequency 2 kHz at the operating voltage of 10 V.

It will be appreciated that while the above embodiments are described with respect to ferroelectric liquid crystals generally and ESH ferroelectric crystals, embodiments of the present invention may also be implemented using deformed ferroelectric liquid crystals, anti-ferroelectric liquid crystals or ferrielectric liquid crystals. It will further be appreciated that the diffraction gratings described above may be of the transmission or reflective type.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A liquid crystal cell structure, comprising:
two polarizers;
a liquid crystal diffractive light modulating cell placed between the two polarizers, the cell comprising:
two transparent substrates treated by photoalignment; and
a ferroelectric liquid crystal layer disposed between the two transparent substrates with current conducting layers, the ferroelectric liquid crystal layer comprising ferroelectric liquid crystals; wherein the ferroelectric liquid crystals are electrically suppressed helix ferroelectric liquid crystals with helix pitch smaller than the thickness of the ferroelectric liquid crystal layer, wherein helixes of the ferroelectric liquid crystals are configured to be unwound upon application of a driving voltage greater than a critical voltage for helix unwinding; and
a voltage source, configured to apply the driving voltage greater than the critical voltage for helix unwinding, which generates an electric field of approximately 6.5 V/μm or less across the ferroelectric liquid crystal layer;
wherein the two transparent substrates treated by photoalignment are configured to provide multiple alignment domains in the ferroelectric liquid crystals with a planar surface orientation;
wherein adjacent domains of the multiple alignment domains are oriented at an angle with respect to each other, providing a grating structure; and
wherein the liquid crystal cell structure is configured to be switched, with a response time of approximately 10 μs or less, between a saturated bright state corresponding to a maximum transmittance and a saturated dark state corresponding to a minimum transmittance based on the application of the driving voltage greater than the critical voltage for helix unwinding by the voltage source, wherein the liquid crystal cell structure is configured to display diffraction patterns while the liquid crystal diffractive light modulating cell is in the saturated bright state, and configured such that no diffraction patterns are displayed while the liquid crystal diffractive light modulating cell is in the saturated dark state.

2. The liquid crystal cell structure of claim 1, wherein the two transparent substrates treated by photoalignment comprise photoalignment material, the photoalignment material being sulfonic azo-dye SD1.

3. The liquid crystal cell structure of claim 1, wherein the two polarizers are crossed.

4. The liquid crystal cell structure of claim 1, wherein the liquid crystal diffractive light modulating cell is further configured to provide a contrast ratio of more than 4200:1.

5. The liquid crystal cell structure of claim 1, wherein the first order diffraction efficiency of the cell structure is higher than 99%.

6. The liquid crystal cell structure of claim 1, wherein the alignment directions for two alignment domains are arranged at an angle greater than the tilt angle of the ferroelectric liquid crystals.

7. The liquid crystal cell structure of claim 1, wherein the ferroelectric crystals have a pre-tilt angle on the surface to avoid chevron defects.

8. The liquid crystal cell structure of claim 1, wherein the liquid crystal cell structure is of a transmission type.

9. The liquid crystal cell structure of claim 1, wherein the liquid crystal cell structure is of a reflective type.

* * * * *